United States Patent

[11] 3,619,250

| [72] | Inventor | Yasushi Nishijima |
| | | Sakai, Japan |
| [21] | Appl. No. | 835,766 |
| [22] | Filed | June 23, 1969 |
| [45] | Patented | Nov. 9, 1971 |
| [73] | Assignee | Kanegafuchi Boseki Kabushiki Kaisha |
| [32] | Priority | July 18, 1968 |
| [33] | | Japan |
| [31] | | 43/51063 |

[54] METHOD FOR MAKING MICROPOROUS SHEET MATERIAL
5 Claims, No Drawings

[52] U.S. Cl. .................................................. 117/63, 117/135.5, 117/161 KP, 264/49
[51] Int. Cl. ........................................................ B44d 1/44, D06n 3/04
[50] Field of Search .......................................... 117/63, 135.5, 161 KP

[56] References Cited
UNITED STATES PATENTS

| 3,526,531 | 9/1970 | Asano et al. | 117/63 |
| 3,484,273 | 12/1969 | Kawase et al. | 117/63 |
| 3,067,483 | 12/1962 | Hollowell | 117/63 |
| 3,190,766 | 6/1965 | Yuan | 117/63 |
| 3,208,875 | 9/1965 | Holden | 117/63 |
| 3,275,468 | 9/1966 | Aoki | 117/63 |
| 3,384,502 | 5/1968 | Japs | 117/135.5 |

*Primary Examiner*—William D. Martin
*Assistant Examiner*—M. Sofocleous
*Attorneys*—Harry C. Bierman, Jordan B. Bierman and Bierman & Bierman

ABSTRACT: A method of making a microporous sheet material is disclosed. A base material is coated with a solution of a film-forming synthetic polymer. The solution consists mainly of polyurethane dissolved in a water-miscible organic solvent. The coated base material is treated with a coagulating liquid containing urea and at least one water-soluble inorganic salt. The coagulated polymer layer is then washed and dried.

METHOD FOR MAKING MICROPOROUS SHEET MATERIAL

This invention relates to an improved method of making a tough and soft polyurethane sheet material high in the moisture-permeability and having a uniform microporous structure.

More particularly the present invention relates to a method of making a tough and soft polyurethane sheet material high in the moisture-permeability and having a uniform microporous structure characterized by applying a water-miscible solvent solution of a film-forming polymer consisting of or mainly of a polyurethane or a solution prepared by adding urea to the above-mentioned polymer solution onto a base material, treating the coated base material with an aqueous solution containing an inorganic salt selected from the group consisting of sodium chloride, aluminum chloride, ammonium chloride, sodium sulfate, aluminum sulfate, and ammonium sulfate and urea, to coagulate the polymer, and then washing and drying the same.

When a layer of an organic solvent solution of film-forming polymer consisting of or mainly of polyurethane is dipped in water, the surface of the layer in contact with water will be quickly coagulated to form a compact or dense structure. However, the coagulation of the interior of the polyurethane layer will be delayed. Thus, large voids will like to be formed in said interior, while the surface will be so compact or dense that it will be difficult to obtain uniform microporous structure throughout the layer. The resulting sheet material is poor in gas-permeability as a whole and is not satisfactory as a synthetic leather surface layer.

In this respect, it has already been described in British Pat. No. 981,642 (Belgian Pat. No. 626,816) that when a polyurethane solution is merely coagulated in water, a moisture-permeable uniform microporous film desirable as a synthetic leather surface layer will not be obtained unless one of the following additional measures is taken:

a. Exposing the layer of the polymer solution to a moistened atmosphere of a controlled relative humidity for a certain period of time before the layer is immersed in water;
b. Adding to the polymer solution water or any other nonsolvent for the polymer in an amount carefully adjusted to convert said polymer solution to a colloid dispersion but not to cause gelling;
c. Adding and mixing water or any other nonsolvent for the polymer into the polymer solution so that the mixture is separated into a gel part and a liquid part, then using the gel part for coating.

The above-mentioned process (a) is described in detail in British Pat. No. 849,155. However, there are disadvantages in that a strictly controlled atmosphere is required and that a long time is required for the coagulation of a coating film of any thickness. Further, not only the relative humidity but also the temperature must be controlled and it is not easy, in industrial practice, to control the atmosphere to obtain homogeneous and uniform microporous films. Further, in such moisture-controlled atmosphere, it takes more than several hours to properly moisten and coagulate a layer (0.6 mm.), such as for example, a dimethyl formamide solution containing 20 percent polyurethane. It is also difficult to determine the proper degree of coagulation.

The above-mentioned process (b) is described in detail, for example, in Belgian Pat. No. 624,250. A considerably good microporous sheet is obtained by this process. However, in preparing the so-called colloid dispersion just before the substantial gelling of said polymer solution, the resulting colloid dispersion will be greatly influenced by the concentration and temperature of said polymer solution to be used, the amount of the nonsolvent to be added thereto and the method of the addition of the nonsolvent, so that it will be necessary to very carefully adjust and control the optimum conditions. Therefore, it is difficult to industrially practice said process.

The process (c) is disclosed for example in Belgian Pat. No. 624,250. However, the step of separating the gel is complicated, and the control and adjustment of the proper concentration and viscosity of the gel are difficult.

Further, in case the above-mentioned processes (b) and (c), the strength of the resulting microporous film will tend to reduce.

Therefore the primary object of the present invention is to provide an improved method of making a moisture-permeable film or sheet material having micropores but no macropores.

Another object of the invention is to provide a method of making a flexible film or sheet material high in the moisture-permeability.

Another object of this invention is to provide an economically advantageous method of making a film or sheet material which is not inferior to natural leather in respect of the durability, appearance and touch.

Still another object of the present invention is to provide an improved method of making an excellent microporous sheet or film material by a wet coagulating process without any such additional step as required in the method disclosed in British Pat. No. 981,642.

There has already been proposed a method of making a sheet of film high in the moisture-permeability and having a microporous structure by applying a water-miscible solvent solution of a polymer consisting of or mainly of a polyurethane onto a base material, coagulating the coated material in an aqueous solution of a water-soluble inorganic salt, and then washing and drying. There had been also already proposed a method of making a sheet of film higher in the moisture-permeability and having a microporous structure by applying a solution containing a polyurethane and urea onto a base material, coagulating the coated material in an aqueous solution of a certain water-soluble inorganic salt, and then washing and drying.

By these methods, it has been successful in simplifying the operation as compared with the above-described conventional processes (a) to (c) and at the same time in producing a film high in moisture-permeability and having a microporous structure. However, in the above-improved methods, there has been encountered a problem in the mass production of microporous film or sheet.

Thus in the continuous mass-production system, there is a time space of several minutes (though different depending on the particular apparatus) between the application of the coating polymer solution on the base material and the immersion of the coated material in the coagulating bath. Therefore, the applied solution layer will be exposed to the atmosphere during this time space and will therefore absorb moisture in the air. This moisture absorption will have a bad influence on the coagulation in the coagulating bath and cause the formation of undesirable macropores in the coagulated layer. This tendency is remarkable particularly when the atmospheric humidity is higher than 45 percent in relative humidity.

However, it is very difficult to control the humidity in response to the daily change in meteorological conditions or particularly to keep the humidity sufficiently low. Further it is almost impossible to eliminate the time space between the coating step and the subsequent immersion step.

I have now found that the above difficulties are overcome by using, as a coagulating aqueous bath, an aqueous solution containing urea and at least one inorganic salt selected from the group consisting of sodium chloride, aluminum chloride, ammonium chloride, sodium sulfate, aluminum sulfate and ammonium sulfate.

When such special coagulating bath is employed, no macropore will be produced even if the coating solution layer is exposed to the atmosphere under any temperature and humidity conditions, and a tough and soft film or sheet material high in the moisture-permeability and having uniform micropores will be able to be industrially easily and simply.

The coating solution may be a conventional polyurethane solution in a water-miscible solvent (e.g. dimethyl formamide). However, it is preferable to add a proper amount of urea in the coating solution.

The advantages of this invention are as follows:
1. The polymer solution can be used directly as such, and can be easily and uniformly applied to the base material without any trouble. The coated material can be immediately and continuously immersed in a coagulating regenerating bath consisting of an aqueous solution containing said salt and urea.

2. When the coagulation bath with proper salt and urea concentration is used; the coated layer of the polymer solution will quickly take a coagulated structure without causing any noticeable shrinkage and deformation when immersed in the bath, and the coagulated material can be continuously washed with water to easily remove the water-miscible organic solvent, inorganic salt and urea.

3. Simply by drying after water-washing, there can be easily produced a tough, soft film or synthetic leather high in the moisture permeability.

4. There is required no special apparatus before the coagulating bath. The operation is simple, and no special temperature and/or humidity control is required. The inorganic salt and urea to be used are both inexpensive and readily available.

In carrying out the present invention, any of conventional film forming polyurethanes which are well known in the art may be used. Generally, for the production of such polyurethane, a prepolymer is prepared by reacting an organic diisocyanate compound with a polyalkylene ether glycol or polyester having terminal hydroxyl groups. The prepolymer is then chain-extended with a chain extender having reactive hydrogen atoms such as diamine, diol or polyol to form a polyurethane elastomer.

The organic diisocyanate may be an aromatic, aliphatic or alicyclic diisocyanate or a mixture of them such as, for example, toluylene-2,4-diisocyanate, toluylene-2,6-diisocyanate, diphenyl methane-4,4'-diisocyanate, 1,5-naphthylene diisocyanate, hexamethylene diisocyanate or paraxylene diisocyanate.

The polyalkylene ether glycol is, for example, polyethylene ether glycol, polypropylene ether glycol, polytetramethylene ether glycol or polyhexamethylene ether glycol or a copolymer or mixture of them. Further, for the polyol or polyalkylene ether may be used glycerine or trimethylol propane.

The polyester which may be used is a polycondensate or an organic acid and a glycol. Preferable glycol is such polyalkylene glycol as ethylene glycol, propylene glycol, tetramethylene glycol or hexamethylene glycol, such cyclic glycol as cyclohexane diol or such aromatic glycol as xylylene glycol. Further, the acid to be used may be succinic acid, adipic acid, sebacic acid or terephthalic acid.

For the chain extender, there may be used such diamine as, for example, hydrazine, ethylene diamine, methylene diorthochloraniline.

If desired, a catalyst such as triethylamine, triethylene diamine, N-ethyl morpholine, dibutyl tin dilaurate or cobalt naphthenate may be used in preparing the polyurethane elastomer.

In the present invention, the polyurethane is used as a solution. The solvent for the polymer must be selected from those which are miscible with water and are able to be extracted with an aqueous solution of the inorganic salt and urea. Therefore, water-miscible solvents are adapted. Examples, of these solvents are any one or a mixture of any of N,N'-dimethyl formamide, dimethyl sulfoxide, tetrahydrofuran, tetramethyl urea, N,N'-dimethyl acetamide, dioxane or butyl carbinol. Further, any of ketones which alone are not good solvents for the polyurethane but are well miscible with the solution, such as acetone and methyl ethyl ketone can be used as a diluent in so far as not coagulating said polymer.

If desired, a small amount of one or more of other film forming polymers soluble in the solvent, such as vinyl homopolymer, for example, vinyl chloride, polyvinyl alcohol, polyacrylonitrile, polyacrylic ester or polyacrylic acid or copolymers of them may be added to the above mentioned polyurethane solution. The amount of such other polymer may be 2 to 40 percent by weight based on the polyurethane.

It is possible to add a coloring agent (such as a dye or pigment), light stabilizing agent or reinforcing agent (such as talc, calcium carbonate or fine powdered silicic acid) to the polymer solution.

Further, it is possible to add urea in the polymer solution to improve the moisture-permeability of the resulting sheet or film. In case a synthetic leather is to be obtained, it is essential that the moisture-permeability is high. Therefore, it is recommended to add urea into the polymer coating solution. The proper amount of urea varies depending on the chemical structure, polymerization degree and concentration of the polymer, but is in a range of 0 to 40 percent, preferably 0 to 35 percent or more preferably 15 to 25 percent by weight based on the polymer in the coating solution. If the amount urea exceeds 40 percent, the solution will tend to gel.

When urea is added to the polymer solution, the moisture-permeability of the resulting porous film will be further improved, because thereby a latent coagulating ability or a coagulation accelerating ability is imparted to the polymer solution and because, after the coagulation, by the removal by washing of the urea remaining in the film, micropores are further additionally imparted and formed to increase the porosity.

The polymer solution is adjusted to be of such viscosity as can be easily applied to the surface of a base material. Generally a viscosity of about 20,000 to 100,000 centipoises is preferable.

The concentration of the polymer in the polymer solution is in a range of 10 to 40 percent, preferably 15 to 35 percent by weight.

The polymer solution (coating solution) is deaerated by any known manner and is coated or applied onto one or both surfaces of a base material for a synthetic leather, such as a woven, knitted or nonwoven fabric, sponge or paper. It is also possible to apply the polymer solution on such a sheet plate as glass, metal or plastic.

The coating may be conducted in any known manner such as by knife coating, roller coating or spraying. Since the polymer solution is homogeneous or uniform, it may easily be applied on said base material and there will be no such disadvantage as in the method described in Belgian Pat. No. 624,250.

For the coagulating bath, it is desirable to feed water at a proper velocity to the polymer solution layer and to cause a coagulation as uniform as possible inward from the outer surface of the layer so that a microporous structure may be formed. For that purpose, it is necessary that, while the penetration and diffusion of water into said polymer solution layer from the coagulating bath and the desolventing into the coagulating bath out of said polymer solution layer occur simultaneously, the respective velocities should keep a proper ratio. That is to say, unless the coagulating velocity is higher than the desolventing velocity, no uniform microporous structure will be formed but supermacropores will be partially produced and numerous macropores will be produced just below the surface layer. It has been found that when a proper substance (additive) to adjust the penetrating velocity (or coagulating velocity) of water from the coagulating bath and the desolventing velocity from the polymer solution layer is present in the coagulating bath, a satisfactory coagulation can be accomplished.

We have found that the inorganic salt would act to control the penetrating velocity of water. We have ascertained that the hydrating property of the salt in the state of an aqueous solution acts favorable in this respect. Of course, the concentration of the salt and the temperature of the bath would have an influence.

The inorganic salt to be added in the coagulating bath is sodium chloride, aluminum chloride, ammonium chloride, sodium sulfate, aluminum sulfate, ammonium sulfate or a mixture of two or more of them. The proper concentration of the salt in the coagulating bath is somewhat different depending on the particular polyurethane solution, the kind of the salt and the meteorological condition of the day but is generally 100–450 grams per liter. Preferable concentration are as follows:

| | |
|---|---|
| Sodium chloride | 200 to 300 g./l. |
| Sodium sulfate | 200 to 300 g./l. |
| Ammonium chloride | 100 to 250 g./l. |
| Aluminum chloride | 250 to 450 g./l. |
| Aluminum sulfate | 100 to 200 g./l. |
| Ammonium sulfate | 150 to 350 g./l. |

The other important feature of the present invention is to add urea to the coagulating bath. It has been found that urea in the coagulating bath acts to control the desolventing velocity. The influence of urea on this desolventing velocity is considered to be established in the relation with its solubility in said solvent.

The concentration of urea in the coagulating bath may vary depending on the kind and concentration of the inorganic salt present in the coagulating bath but is generally in the range of 100 to 350 g./l., preferably 150 to 300 g./l. In case it is lower than 100 g./l., it will be likely to be influenced by the humidity and the production of a film having a uniform microporous structure will tend to be difficult. Further, in case it is higher than 350 g./l., the concentration of the water miscible solvent (for example, N,N'-dimethyl formamide) near the surface of the coating solution layer will become high and the solubility of said inorganic salt will reduce remarkably so that the salt will be crystallized on the surface and will be likely to hurt irregularly the surface of the porous film.

A film having an excellent microporous structure is formed by the actions of both of said inorganic salt as a water penetrating velocity adjusting agent and urea as a desolventing velocity adjusting agent.

The temperature of the coagulating bath is in the range of 30° to 55° C., preferably 40° to 45° C. In case it is lower than 30° C., the crystals of the inorganic salt will be likely to be precipitated and the microporous film surface will be hurt by the crystals. When it is higher than 55° C., the operation will become difficult and moisture-permeability of the resulting film will be reduced.

According to the present invention, the resulting films have always uniform microporous structure and no macropore, even if the composition and temperature of the coagulating bath are fixed to be constant and there is a change in meteorological conditions.

After the coagulation, the film is washed with water to remove the water-miscible organic solvent, inorganic salt and urea remaining in said film, and is then dried under the normal conditions.

When the polymer solution is applied onto one or both surfaces of such sheet or plate as glass, metal or plastic, the resulting microporous film thereon may be peeled off the base sheet or plate. When the polymer solution is applied onto one or both surfaces of a bath material suitable for a synthetic leather such as a woven or nonwoven fabric, film, sponge or paper or the like, the resulting microporous film will be bonded firmly on said base material. The material thus obtained is useful as a synthetic leather.

The microporous film may be finish-coated with an ordinary paint or lacquer for leathers, without adversely affecting the desirable property and performance of the product.

The invention will be explained in more detail with reference to the following examples in which all parts are by weight. In these examples the breaking strength, elongation, moisture-permeability, bending strength and presence of macropores in the resulting films were determined as follows:

1. Breaking strength and elongation:

These were measured in respect of a sample of a width of 2 cm. and a holding length of 5 cm. at a pulling velocity of 3 cm./minute with an Instron Tester.

2. Moisture-permeability:

The amount of weight increase of calcium chloride through a predetermined area of the sample film in an atmosphere of a relative humidity of 80 percent at 30° C. was measured and the moisture-permeability was represented by an amount of weight increase (mg.) per unit time (hour) per unit area (cm.$^2$), i.e. mg./hr./cm.$^2$ The larger this value, the higher the moisture-permeability.

3. Bending strength:

This was measured with Flexi-O-meter (made by Yasuda Precise Machine Manufactory, Ltd., Japan).

4. Presence of macropores:

The cut surface of the film was microscopically observed. Also two-foled surface of the film was scraped with a razor and the cut-exposed face was observed with a microscope to determine whether there exist macropores (10 microns or larger in average diameter).

EXAMPLE 1

One hundred and five parts of polyethylene adipate of an average molecular weight of 1,050 having terminal –OH groups were dissolved in 200 parts of anhydrous dioxane, and 40.0 parts of methylene bis(4-phenyl isocyanate) were added thereto. The solution was kept in a nitrogen atmosphere at 80° C. for 2 hours and was then cooled to 30° C. To the resulting solution of the prepolymer having terminal –NCO groups, were added 3.7 parts of ethylene glycol and 0.02 part of triethylene of diamine together with 100 parts of anhydrous dioxane to conduct a chain-extending reaction for 3 hours. Then the resulting polymer solution was cooled and was poured into water to remove the greater part of the dioxane. The polymer was recovered and then dried at 80° C. under a reduced pressure. The polymer was dissolved in N,N'-dimethyl formamide so as to be of a concentration of 30 percent by weight. The viscosity of this polymer solution was 45,000 centipoises at 30° C.

This polymer solution was applied onto a glass plate so as to be about 1 mm. thick. The coated glass plate was then left for 5 minutes in an atmosphere of a relative humidity of 80 percent at 20° C. and was then immersed at 40° C. for 10 minutes in an aqueous solution of sodium sulfate and urea in the concentration shown in table 1. Then the glass plate with a coagulated film thereon was dipped into a hot water bath at 50° C. for washing. The film was peeled off the glass plate, was washed with hot water for 30 minutes to be well desolvented and was air-dried at 100° C. for 30 minutes. The properties of the thus obtained films were as shown in table 1.

As a typical example, the film obtained by using a coagulating bath of an aqueous solution containing 250 g./l. of sodium sulfate and 200 g./l. of urea was of a breaking strength of 0.97 kg./mm.$^2$ and an elongation of 518 percent.

It will be appreciated from the results shown in table 1 that a tough, soft, uniform microporous film high in the moisture-permeability is obtained by the coagulation in an aqueous solution of sodium sulfate in a concentration of 200 to 300 g./l. and urea in a concentration of 100 to 300 g./l.

TABLE 1

| urea (g./l.) | Properties of film | Sodium sulfate (g./l.) | | | | |
|---|---|---|---|---|---|---|
| | | 150 | 200 | 250 | 300 | 330 |
| 50 | Macropores | present | present | present | present | present |
| | Moisture-permeability (mg./hr./cm.$^2$) | | | | | |
| 100 | Macropores | present | absent | absent | absent | absent |
| | Moisture-permeability | 3.9 | 4.2 | 4.7 | 4.3 | 3.9 |
| 150 | Macropores | present | absent | absent | absent | absent |
| | Moisture- | | | | | |

As a typical example, the film obtained by the use of a coagulating bath of an aqueous solution containing 250 g./l. of sodium sulfate and 200 g./l. of urea was of a breaking strength of 0.96 kg./mm.$^2$ and an elongation of 530 percent.

It will be recognized from the results shown in table 2 that tough, soft, microporous films high in the moisture-permeability are obtained through the coagulation in an aqueous solution containing sodium sulfate in a concentration of 200 to 300 g./l. and urea in a concentration range of 100 to 300 g./l.

EXAMPLE 3

The polyurethane solution of example 1 was applied to coat a glass plate so as to be about 1 mm. thick. The coated glass plate was then left for 5 minutes in an atmosphere of temperature and humidity indicated in table 3 and was then immersed for 10 minutes in an aqueous solution (coagulating bath) at the temperature indicated in table 3 and containing 250 g./l. of sodium sulfate and 200 g./l. of urea. Then it was transferred into a hot water bath at 50° C. and the produced film was peeled off the glass plate. The film was washed with hot water for 30 minutes and air-dried. The properties of the resulting films are shown in table 3 wherein the mark 0 means that there was no macropore and the numeral given at the right of the mark 0 represents the moisture-permeability.

Further, table 4 shows the breaking strength and elongation of the films produced through the coagulation at 45° C. after being left in an atmosphere of temperature and humidity indicated in said table.

For comparison, the film obtained by applying the same polyurethane solution in the same manner, then leaving it for 5 minutes in an atmosphere of a relative humidity of 75 percent at 25° C., then immersing the same for 10 minutes in an aqueous solution containing 250 g./l. of sodium sulfate, and water-washing and drying, had macropores and was of a moisture-permeability of 4.1 and breaking strength and elongation of 0.96 kg./mm.$^2$ and 570 percent, respectively.

EXAMPLE 2

Fifteen percent by weight of urea based on the polyurethane contained in the solution was added to the N,N'-dimethyl formamide solution of the polyurethane prepared in example 1 and the mixture was agitated to prepare a coating solution. This coating solution was applied onto the same glass plate as in example 1 so as to be about 1 mm. thick. The coated glass plate was then left for 5 minutes in an atmosphere of a relative humidity of 80 percent at 20° C. and was then immersed at 40° C. for 10 minutes in an aqueous solution of sodium sulfate and urea of the concentrations indicated in table 2 to coagulated the coating solution layer. Then the glass plate with the film thereon was transferred into a hot water bath at 50° C. The film was peeled off the glass plate washed with hot water for 30 minutes and dried. The properties of the thus obtained films are shown in table 2.

TABLE 2

| Urea (grams/ liters) | Properties of film | Sodium sulfate (grams/liters) | | | | |
|---|---|---|---|---|---|---|
| | | 150 | 200 | 250 | 300 | 330 |
| 50 | Macropores | Present | Present | Present | Present | Present |
| | Moisture permeability (mg./hr./cm.$^2$) | | | | | |
| 100 | Macropores | Present | Absent | Absent | Absent | Absent |
| | Moisture permeability | 7.4 | 7.7 | 8.2 | 7.8 | 7.4 |
| 150 | Macropores | Present | Absent | Absent | Absent | Absent |
| | Moisture permeability | 7.2 | 7.6 | 8.2 | 7.9 | 7.3 |
| 200 | Macropores | Present | Absent | Absent | Absent | (¹) |
| | Moisture permeability | 6.9 | 8.6 | 7.4 | 7.8 | 7.7 |
| 250 | Macropores | Present | Absent | Absent | Absent | (¹) |
| | Moisture permeability | 7.4 | 8.1 | 8.3 | 7.7 | 7.4 |
| 300 | Macropores | Absent | Absent | Absent | Absent | (¹) |
| | Moisture permeability | 7.0 | 7.6 | 8.3 | 7.7 | |
| 350 | Macropores | Present | (¹) | (¹) | | |
| | Moisture permeability | | | | | |
| 0 | Macropores | | | | Present | Present |
| 380 | Moisture permeability | | | | 3.5 | 3.1 |
| | Sodium sulfate were crystallized out and the coagulating bath could not be used. | | | | | |

¹ Crystals deposited on surface.

| | permeability | 3.7 | 4.1 | 4.7 | 4.4 | 3.8 |
|---|---|---|---|---|---|---|
| 200 | Macropores | present | absent | absent | absent | crystals deposited on surface |
| | Moisture-permeability | 3.4 | 5.1 | 4.9 | 4.3 | 4.2 |
| 250 | Macropores | present | absent | absent | absent | crystals deposited on surface |
| | Moisture-permeability | 3.9 | 4.6 | 4.8 | 4.2 | 3.9 |
| 300 | Macropore | present | absent | absent | absent | crystals deposited on surface |
| | Moisure-permeability | 3.5 | 4.1 | 4.8 | 4.2 | 3.9 |
| | Macropores | A few | crystals deposited on surface | crystals deposited on Surface | | |
| | Moisture-permeability | | | | | |
| 0 | Macropores | | | | present | present |
| 380 | Moisture-permeability | | | | 3.5 | 3.1 |
| | Sodium sulfate were crystallized out and the coagulating bath could not be used. | | | | | |

TABLE 3

| Coated solution layer left at— | | Coagulating bath temperature, ° C. | | | | | | |
|---|---|---|---|---|---|---|---|---|
| Temperature (° C.) | Relative humidity (percent) | 25 | 30 | 35 | 40 | 45 | 55 | 60 |
| 25 | 43 | (¹) | 4.2 | 4.3 | 4.8 | 4.9 | 4.3 | 2.8 |
| 25 | 55 | (¹) | 4.5 | 4.5 | 4.9 | 5.0 | 4.2 | 2.7 |
| 25 | 65 | (¹) | 4.4 | 4.5 | 4.8 | 4.8 | 4.3 | 2.7 |
| 25 | 75 | (¹) | 4.3 | 5.2 | 5.0 | 5.2 | 4.2 | 2.8 |
| 35 | 75 | (¹) | 4.3 | 4.5 | 4.9 | 5.0 | 4.3 | 2.7 |
| 25 | 85 | (¹) | 4.6 | 4.8 | 5.0 | 4.9 | 4.3 | 3.0 |
| 35 | 85 | (¹) | 4.3 | 4.5 | 4.8 | 4.9 | 4.2 | 2.8 |
| 25 | 93 | (¹) | 4.2 | 4.5 | 4.6 | 4.6 | 4.3 | 2.7 |
| 35 | 92 | (¹) | 4.2 | 4.3 | 4.5 | 4.5 | 4.2 | 2.6 |

¹ Crystals deposited on surface.

TABLE 4

| Coated layer left at | | Breaking strength and elongation | |
|---|---|---|---|
| Temperature (° C.) | Relative humidity (percent) | Strength (kg./mm.²) | Elongation (percent) |
| 25 | 43 | 1.13 | 553 |
| 25 | 55 | 0.89 | 563 |
| 25 | 65 | 1.03 | 537 |
| 25 | 75 | 0.97 | 518 |
| 35 | 75 | 0.95 | 538 |
| 25 | 85 | 0.81 | 561 |
| 35 | 85 | 0.85 | 532 |
| 25 | 93 | 1.01 | 540 |
| 35 | 92 | 0.90 | 565 |

As evident also from the above results, in the method of the present invention, irrespective of the temperature and humidity conditions in which the coated polyurethane solution layer is exposed before it is immersed in the coagulating bath, there is obtained a uniform microporous film having no macropore and high in the moisture-permeability when coagulated in the coagulating bath at 30°–55° C. Particularly, at a coagulating temperature of 40° to 55° C., the moisture-permeability of the resulting film becomes higher.

EXAMPLE 4

Twenty percent by weight (based on polyurethane) of urea was added to the polyurethane solution prepared in example 1 and the mixture was agitated to prepare a coating solution. Except the use of this particular coating solution, the operation was conducted under exactly the same conditions as in example 3. The results are shown in tables 5 and 6. In table 5, the mark 0 shows that no macropore was present in the film and the numeral given at the right of the mark 0 shows the moisture-permeability. Table 6 shows the breaking strength and elongation of the film produced by leaving the coated solution layer for a fixed time in the atmosphere under temperature and humidity conditions indicated in the Table and then coagulating it in a coagulating bath at 45° C.

TABLE 5

| Coated solution layer left at— | | | | | | | | |
|---|---|---|---|---|---|---|---|---|
| Temperature (° C.) | Relative humidity (percent) | Coagulating bath temperature, ° C. | | | | | | |
| | | 25 | 30 | 35 | 40 | 45 | 55 | 60 |
| 25 | 43 | (¹) | 7.7 | 8.2 | 8.3 | 8.2 | 6.0 | 2.5 |
| 25 | 55 | (¹) | 8.0 | 8.5 | 8.5 | 8.5 | 6.0 | 2.7 |
| 25 | 65 | (¹) | 7.8 | 8.3 | 8.4 | 8.7 | 6.0 | 2.6 |
| 25 | 75 | (¹) | 7.8 | 8.5 | 8.8 | 9.1 | 6.1 | 2.7 |
| 35 | 75 | (¹) | 7.9 | 8.4 | 8.7 | 8.8 | 6.8 | 2.6 |
| 25 | 85 | (¹) | 8.2 | 8.3 | 8.8 | 8.9 | 6.2 | 2.8 |
| 35 | 85 | (¹) | 8.0 | 8.3 | 8.6 | 8.7 | 6.0 | 2.8 |
| 25 | 93 | (¹) | 7.8 | 8.0 | 8.8 | 9.0 | 6.1 | 2.7 |
| 35 | 92 | (¹) | 7.6 | 8.1 | 8.4 | 8.4 | 6.1 | 2.7 |

¹ Crystals deposited on furface.

TABLE 6

| Temperature (° C.) | Relative humidity (percent) | Strength (kg./mm.²) | Elongation (percent) |
|---|---|---|---|
| 25 | 43 | 1.08 | 550 |
| 25 | 55 | 0.92 | 570 |
| 25 | 65 | 1.10 | 520 |
| 25 | 75 | 0.90 | 520 |
| 35 | 75 | 0.88 | 531 |
| 25 | 85 | 0.80 | 550 |
| 35 | 85 | 0.86 | 540 |
| 25 | 93 | 0.99 | 543 |
| 35 | 92 | 0.92 | 568 |

For comparison, the operation was conducted under exactly the same conditions as mentioned above except that an aqueous solution (to which no urea had been added) containing 200 g./l. of sodium sulfate was used as the coagulating bath and that the coated layer was left for 5 minutes in an atmosphere of a relative humidity of 75 percent at 25° C. The resulting film had macropores and was of a moisture-permeability of 6.9 and a breaking strength and elongation of 0.95 kg./mm.² and 545 percent, respectively.

As evident also from the above results, according to the method of the present invention, when urea is added to the polyurethane solution, even if the coated solution layer is exposed to an atmosphere under any humidity and temperature conditions, there is obtained a uniform microporous film having no macropore and high in the moisture-permeability through the coagulation at 30°–55° C. Particularly with a coagulating bath at 40° to 45° C., the moisture-permeability of the resulting film becomes higher.

Further, in the method of the present invention, as evident in comparison with the results in example 3, the moisture-permeability of the film is higher in case urea is added to the polyurethane coating solution than in case no urea is added thereto.

EXAMPLE 5

Each of an N,N'-dimethyl formamide solution of an ester type polyurethane (trade name Cryspon, product of Japan Reichhold Company, Ltd.) (a concentration 35 percent) and a solution prepared by adding thereto 20 percent by weight of urea (based on the polyurethane) was applied onto a glass plate so as to be 1 mm. thick, and the whole was left for 3 minutes in an atmosphere at a temperature and relative humidity of 20° C. and 75 percent, respectively, and was then immersed at 40° C. for 10 minutes in an aqueous solution (coagulating bath) containing each of the inorganic salts indicated in table 7 and 200 g./l. of urea. The glass plate with a coagulated film thereon was then transferred into a hot water bath at 50° C. and the film was peeled off the glass plate, washed with hot water for 30 minutes and dried at 100° C. for 3 minutes. The properties of the films are shown in table 7.

TABLE 7

| Inorganic salt | Concentration (grams/liters) of salt | Urea in the coating solution | Breaking strength (kg./mm.²) | Breaking elongation (percent) | Moisture-permeability | Macropores in the film |
|---|---|---|---|---|---|---|
| Sodium chloride | 250 | Absent | 0.84 | 536 | 4.8 | Absent |
| Do | 250 | Present | 0.83 | 535 | 8.9 | Do |
| Sodium sulfate | 250 | Absent | 0.97 | 543 | 4.9 | Do |
| Do | 250 | Present | 0.96 | 541 | 9.0 | Do |
| Aluminum chloride | 300 | Absent | 0.81 | 479 | 4.5 | Do |
| Do | 300 | Present | 0.81 | 480 | 8.2 | Do |
| Aluminum sulfate | 200 | Absent | 0.70 | 375 | 4.3 | Do |
| Do | 200 | Present | 0.71 | 376 | 8.4 | Do |
| Ammonium chloride | 300 | Absent | 0.99 | 517 | 4.5 | Do |
| Do | 300 | Absent | 0.99 | 517 | 8.5 | Do |
| Ammonium sulfate | 350 | Absent | 1.03 | 528 | 4.5 | Do |
| Do | 350 | Present | 1.02 | 526 | 8.7 | Do |
| Magnesium chloride | 250 | Absent | 0.93 | 533 | 2.4 | Present |
| Do | 250 | Present | 0.95 | 531 | 2.4 | Do |
| Magnesium sulfate | 200 | Absent | 0.92 | 521 | 2.4 | Do |
| Do | 200 | Present | 0.92 | 520 | 2.5 | Do |
| Calcium chloride | 250 | Absent | 1.06 | 563 | 2.2 | Do |
| Do | 250 | Present | 1.06 | 560 | 2.2 | Do |
| Calcium chloride | 250 | Absent | 0.92 | 535 | 2.4 | Do |
| Do | 250 | Present | 0.93 | 530 | 2.3 | Do |

As evident from the above results, the properties of the films are different depending on the particular inorganic salt coexisting with urea in the coagulating bath. Only with the particular inorganic salts used in the present invention, a uniform microporous film high in the moisture-permeability can be produced. In case any other inorganic salt is used, a film having macropores will be formed and its moisture-permeability is low.

EXAMPLE 6

An N,N'-dimethyl formamide solution of an ester type polyurethane (trade name Cryspon, product of Japan Reichhold Company, Ltd.) (concentration of 35 percent) as mixed various amounts of urea as are shown in table 8 was applied onto a glass plate so as to be 0.7 mm. thick. The coated glass plate was left for 5 minutes in an atmosphere of a relative humidity of 80 percent at 25° C. and was then immersed at 45° C. for 10 minutes in an aqueous solution (coagulating bath) containing 250 g./l. of sodium sulfate and 250 g./l. of urea. The glass plate with a coagulated film thereon was then immersed in a hot water bath at 50° C. and the film was peeled off the glass plate, washed with water and air-dried at 105° C. for 10 minutes. The properties of the resulting films are shown in table 8.

For comparison, the operation was conducted under the same conditions except that the coating solution does not contain urea and the coagulating bath consists of an aqueous solution of 250 g./l. of sodium sulfate. The resulting film is mentioned as control 1 in table 8. Further, the operation was conducted under the same conditions as are mentioned above except that the coating solution contains 15 percent by weight of urea and the coagulation bath consists of an aqueous solution of 250 g./l. of sodium sulfate. The resulting film is mentioned as control 2 in table 8.

TABLE 8

| Amount of urea (percent) | Breaking strength (kg./mm.²) | Breaking elongation (percent) | Moisture-permeability | Macropores in the film |
| --- | --- | --- | --- | --- |
| 0 | 1.00 | 515 | 4.9 | Absent. |
| 5 | 0.93 | 547 | 5.6 | Do. |
| 10 | 0.93 | 543 | 7.9 | Do. |
| 15 | 0.95 | 543 | 8.8 | Do. |
| 20 | 0.91 | 529 | 9.1 | Do. |
| 25 | 0.87 | 498 | 9.3 | Do. |
| 30 | 0.92 | 511 | 9.6 | Do. |
| 35 | 0.85 | 496 | 9.8 | Do. |
| 40 | 0.86 | 493 | 10.6 | Do. |
| 45 | The polyurethane solution gelled and could not be applied. | | | |
| Control 1 | 0.93 | 530 | 4.2 | Present. |
| Control 2 | 0.93 | 529 | 7.8 | Do. |

As evident from the above results, with the increase of the amount of urea added to the polyurethane-solution, the moisture-permeability of the resulting film becomes high. However, even if no urea is added to the coating solution, a film high in the moisture permeability will be obtained.

Further, as evident also from the controls, unless a solution containing both sodium sulfate and urea is used as the coagulating bath, no uniform microporous film having no macropore can be obtained.

EXAMPLE 7

An N,N'-dimethyl formamide solution of an ester type polyurethane (trade name Cryspon, product of Japan Reichhold Company, Ltd.) (concentration of 30 percent) or the same polyurethane solution but added with 15 percent by weight (based on the polyurethane) of urea was applied to be 0.8 mm. thick onto the surface of a base fabric of a thickness of 0.8 mm. and density of 0.52 and made of 3 parts of a nonwoven fabric consisting of nylon-6 fibers of 1.2 deniers and polyester fibers of 1.5 deniers, the nonwoven fabric having been set with 1 part of a butadien-acrylonitrile copolymer. The coated base fabric was left for 5 minutes in an atmosphere of various temperatures and humidities indicated in table 9 and was immersed for 10 minutes in an aqueous solution at 45° C. containing 250 g./l. of sodium sulfate and 200 g./l. of urea. The base fabric with a coagulated film thereon was then washed well in a hot water bath at 50° C. and was then air-dried at 110° C. for 10 minutes. Then an acrylic ester type paint for leathers was applied by spraying onto the surface of the polyurethane layer and was dried and further a nitrocellulose type clear lacquer for leathers was applied onto the surface for finishing. Each of the products was soft and lustrous, natural leatherlike in touch, high in the moisture-permeability and strength as shown in table 9. The uniform microporous film was firmly bonded and laminated on said base fabric.

TABLE 9

| Urea in the coating solution | Atmosphere | | Breaking strength and elongation | | | Moisture-permeability | Macropores in the film |
| --- | --- | --- | --- | --- | --- | --- | --- |
| | Temperature (° C.) | Relative humidity (percent) | Bending strength | Strength (kg./mm.²) | Elongation (percent) | | |
| Absent | 22 | 52 | (¹) | 1.04 | 29 | 4.1 | Absent. |
| Present | 22 | 52 | (¹) | 0.99 | 28 | 6.1 | Do. |
| Absent | 27 | 77 | (¹) | 0.98 | 27 | 4.1 | Do. |
| Present | 27 | 77 | (¹) | 0.99 | 28 | 6.6 | Do. |
| Absent | 28 | 85 | (¹) | 1.02 | 28 | 4.0 | Do. |
| Present | 28 | 85 | (¹) | 1.00 | 29 | 6.5 | Do. |
| Absent | 25 | 93 | (¹) | 0.98 | 29 | 4.1 | Do. |
| Present | 25 | 93 | (¹) | 0.99 | 29 | 6.5 | Do. |
| Absent | 35 | 83 | (¹) | 0.99 | 28 | 4.0 | Do. |
| Present | 35 | 83 | (¹) | 0.98 | 28 | 6.5 | Do. |

¹ Not broken with 200,000 times bending.

EXAMPLE 8

An N,N'-dimethyl formamide solution of an ester type polyurethane (trade name Paraprene-22, product of Hodogaya Chemical Company, Ltd., Tokyo, Japan) (concentration 25 percent), a solution prepared by adding 25 percent by weight of urea into the above polyurethane solution, a solution prepared by adding 20 percent by weight of polyvinyl chloride (based on the polyurethane) and 25 percent by weight of urea into the above-mentioned polyurethane solution or a solution prepared by adding 7 percent by weight of polyacrylic acid and 25 percent by weight of urea into the above-mentioned polyurethane solution was applied to be 0.5 mm. thick onto a mix-spun broadcloth of polyester and cotton fibers.

The coated broadcloth was left for 5 minutes in an atmosphere of a relative humidity of 85 percent at 25° C. and was immersed at 40° C. for 10 minutes in an aqueous solution containing 250 g./l. of sodium sulfate and 200 g./l. of urea. It was then washed with water and was air-dried at 110° C. for 10 minutes, The thus obtained synthetic leather had a structure in which a uniform microporous film was laminated and bonded on said base fabric, a natural leatherlike touch and a high-moisture permeability. The properties of the products are shown in table 10.

For comparison, a product made by using the above-mentioned polyurethane solution as a coating solution and using water as the coagulating bath is indicated as control A, a product made by using an aqueous solution of 250 g./l. of sodium sulfate for the coagulating bath is indicated as control B and a product made by using a solution prepared by adding 25 percent by weight of urea into the above-mentioned polyurethane solution and using an aqueous solution containing 250 g./l. of sodium sulfate as the coagulating bath is indicated as control C in table 10. These control samples were treated under the same conditions as are mentioned above.

TABLE 10

| Synthetic resin coexisting in the coating solution | Bending strength | Moisture-permeability | Macropores in the film |
|---|---|---|---|
| Absent (polyurethane only) | (¹) | 4.5 | Absent. |
| Absent (polyurethane and urea) | (¹) | 6.9 | Do. |
| Polyvinyl chloride | (¹) | 6.8 | Do. |
| Polyacrylic acid | (¹) | 6.8 | Do. |
| Control: | | | |
| A | (¹) | 1.8 | Present. |
| B | (¹) | 3.5 | Do. |
| C | (¹) | 4.5 | Do. |

¹ Not broken with 200,000 times.

What I claim is:

1. A method of making a microporous sheet material by coating a base material with a solution of film-forming synthetic polymer comprising polyurethane dissolved in a water-miscible organic solvent, treating the coated base material with an aqueous coagulating liquid to coagulate the polymer layer, washing and drying the same, characterized in that the said aqueous coagulating liquid contains 100 to 350 grams per liter of urea and 100 to 450 grams per liter of at least one water soluble inorganic salt selected from the group consisting of sodium chloride, aluminum chloride, ammonium chloride, sodium sulfate, aluminum sulfate and ammonium sulfate.

2. A method as claimed in claim 1 wherein the polymer solution contains urea.

3. A method as claimed in claim 2 wherein the content of urea in the polymer solution is up to 40 percent by weight based on the polymer in the solution.

4. A method as claimed in claim 1 wherein the temperature of the coagulating liquid is 30°–55° C.

5. A method as claimed in claim 1 wherein the polymer in the polymer coating solution consists of a polyurethane and 2–40 percent by weight, based on the polyurethane, of other film-forming vinyl polymer or copolymer.

* * * * *